United States Patent [19]

Gruber et al.

[11] 4,034,145

[45] July 5, 1977

[54] ANAEROBICALLY HARDENING ADHESIVES AND SEALANTS CONTAINING AN ORGANIC PERCARBOXYLIC ACIDS

[75] Inventors: Werner Gruber, Dusseldorf-Gerresheim; Joachim Galinke, Dusseldorf-Holthausen; Jürgen Keil, Monheim-Hitdorf, all of Germany

[73] Assignee: Henkel & Cie G.m.b.H., Dusseldorf, Germany

[22] Filed: Aug. 25, 1975

[21] Appl. No.: 607,898

[30] Foreign Application Priority Data

Sept. 2, 1974 Germany .......................... 2441943

[52] U.S. Cl. .............................. 526/328; 428/463; 526/227; 526/232

[51] Int. Cl.² .............. C08F 120/12; C08F 120/20

[58] Field of Search ................. 260/89.5 R, 89.5 A; 526/328

[56] References Cited

UNITED STATES PATENTS

| 3,494,898 | 2/1970 | Meyer et al. | 260/89.5 A |
| 3,682,875 | 8/1972 | O'Sullivan et al. | 260/89.5 R |
| 3,775,385 | 11/1973 | Ozono et al. | 260/89.5 A |

*Primary Examiner*—Harry Wong, Jr.
*Attorney, Agent, or Firm*—Hammond & Littell

[57] ABSTRACT

Organic percarboxylic acids are stabilizers for anaerobically-setting adhesive compositions wherein the principal adhesive component is a (meth) acrylic acid ester and the catalyst is an organic peroxide. The percarboxylic acid improves the storage-stability of the adhesives in contact with air.

10 Claims, No Drawings

ANAEROBICALLY HARDENING ADHESIVES AND SEALANTS CONTAINING AN ORGANIC PERCARBOXYLIC ACIDS

FIELD OF THE INVENTION

The invention relates to systems (i.e., compositions) which harden rapidly in the absence of oxygen, based on (meth) acrylic esters and organic peroxides, particularly hyperoxides, which are known as anaerobic adhesives, sealing compounds, and the like, and which contain an agent which improves their storage-stability. They are preferably used in solvent-free form for the above-mentioned purposes. The invention includes methods for the preparation of these compositions.

As essential components these systems contain monomeric or oligomeric (meth) acrylic esters of mono- or poly-valent alcohols, as well as peroxide or hydroperoxide. In order to ensure sufficiently rapid hardening in the absence of oxygen, accelerators are added to the systems. For this purpose it is known that, for example, amines, particularly tertiary amines, carboxylic hydrazides, N,N'-dialkyl hydrazines, and carboxylic sulfimides are effective. Many of these accelerators, however, cause the adhesives to polymerize prematurely in storage and thus to become unuseable.

Accordingly, a demand has arisen for compositions of the type mentioned which contain an agent which renders the compositions adequately storage-stable but which does not interfere with the beneficial properties of the composition.

RELATED ART

A variety of compositions of the foregoing type are disclosed in U.S. Pat. Nos. 2,626,178; 2,896,950; 3,041,322; 3,043,820; 3,300,547; 3,046,262; 3,2181305; and 3,425,988.

OBJECTS OF THE INVENTION

The principal object of the present invention is to find compounds which prevent the premature polymerization of these adhesives and sealing compounds in the presence of small amounts of air, but at the same time have no adverse effect on the hardening rate when used under anaerobic conditions.

A further object of the invention is to provide an aerostable, anaerobially-setting adhesive composition comprising a polymerizable (meth) acrylate ester as principal latent adhesive component, a peroxide polymerization catalyst therefor, an agent which accelerates the action of the catalyst in the absence of free oxygen but which is essentially inert in the presence of free oxygen, and an agent which renders the composition storage-stable in the presence of molecular oxygen while not adversely affecting the setting time of the adhesive in the absence of oxygen.

BRIEF SUMMARY OF THE INVENTION

The present invention provides an aerostable, anaerobically-setting adhesive composition comprising a polymerizable (meth) acrylate ester as principal latent adhesive component, a peroxide or hydroperoxide polymerization catalyst for the ester, and a percarboxylic acid as stabilizer for the composition. The composition may contain one or more stabilizers and one or more auxiliary accelerators. In preferred embodiments the compositions are adequately storage-stable at room temperature in the presence of free oxygen, but harden rapidly when used as a cement with exclusion of air, and provide strong metal-to-metal bonds.

According to the invention, the anaerobically hardening adhesives and sealing compounds based on (meth) acrylic esters contain one or more organic percarboxylic acids in small but effective amount as stabilizing agent. Generally this falls within the range of 0.01% to 10% by weight, preferably 0.1% to 5% by weight, based on the weight of the (meth) acrylic ester. The amount varies with regard to the other auxiliary substances, particularly with respect to the particular accelerator present and the improvement in stability which it is desired to effect. The per acids according to the invention prevent premature polymerization of the anaerobically hardening adhesives and sealing compounds based on (meth) acrylic esters and thus permit the preparation of compositions which are more storage stable. At the same time, they have the favorable property of decreasing the setting time. Thus a double function is possessed by these acids.

As per acids can be used both aliphatic and aromatic per acids, which can also be substituted, if desired. We mention, by way of example, perbenzoic acid and perphthalic acid. Preferred among the aliphatic acids are the alkyl monopercarboxylic acids which contain 2 to 8 carbon atoms in the alkyl radical. For practical reasons peracetic acid is preferred, which is used preferably as a solution in glacial acetic acid.

In preferred embodiments the compositions of the present invention contains an adhesive component [e.g., a (meth) acrylate ester]; a polymerization initiator or catalyst (e.g., a hydroperoxy alcohol); an oxygen adjuvant as polymerization inhibitor (e.g., a quinone); an accelerator (e.g., a tertiary amine); and a per-carboxylic acid as stabilizer. The components are mutually soluble or homogeneously dispersible.

The anaerobic systems (i.e., compositions) based on (meth) acrylic esters have been known for a long time. These systems are composed, for example, of (meth) acrylic esters of polyvalent alcohols, such as ethylene glycol; diethylene glycol; triethylene glycol; tetraethylene glycol; polyethylene glycol; glycerin; pentanediol; di-, tri-, or tetrapropylene glycol; or the (meth) acrylic esters of dimerized or polymerized cyclopentadienol, tetrahydrofuryl alcohol, cyclopentanol, or cyclohexanol. The reaction products of glycide ethers of polyvalent phenols with acrylic acid or (meth) acrylic acid provide another group of anaerobically hardening adhesives.

Another essential components of the anaerobically hardening adhesives are the peroxide initiators. These are preferably hydroperoxides which derive from hydrocarbons with a chain length of 3 to 18 carbon atoms. Suitable for example, are cumene hydroperoxide, tert.-butyl hydroperoxide, methyl ethyl ketone hydroperoxide, and diisopropyl benzene hydroperoxide. Furthermore, peroxides which have a half life of 10 hours at a temperature between about 80° and 140° are also suitable. Here we mention particularly tert.-butyl perbenzoate, ditert.-butyl-diperoxyphthalate, 2,5-dimethyl-2,5,-bis-(tert.-butylperoxy)-hexane, bis-(1-hydroxy-cyclohexy)peroxide: tert.-butyl-peroxyacetate, 2,5-dimethyl-hexyl-2,5-di-(peroxy-benzoate), tert.-butylperoxy-isopropyl carbonate, n-butyl-4,4-bis-(tert.-butylperoxy) valerate, 2,2-bis-(tert.-butylperoxy)-butane and di-tert.-butyl peroxide.

The peroxides should be present in an amount of 0.01% to 20%, preferably 1.0% to 10% based on the weight of the total mixture. They are used mostly as phlegmatized solutions or pastes, that is, with a relatively low content of inert substances, for example, dimethyl phthalate or cumeme or the like.

According to a preferred embodiment of the invention, an organic amine or hydrazide or sulfimide are added as accelerators with the compositions of the present invention. In this instance the systems (i.e., the compositions) exhibit their best properties with reference to a fast setting time. As amines N,N-dimethyl-o-toluidine, N,N-dimethyl-p-toluidine, and tri-n-butylamine are suitable. As hydrazines the hydrazines of mono esters of carboxylic acid, for example the ethyl and tert.-butyl ester of the hydrazides of acetic acid and of benzoic acid are suitable. Among the sulfimides, benzoic acid sulfimide is preferred. The above-named compounds are used only in relatively small proportions, e.g., from 0.1% to 2.5% by weight.

Finally thickeners, plasticizers, inorganic fillers and dyes can be added to the adhesive and sealing compounds according to the invention. Suitable as thickeners are polymeric compounds such as polymethyl methacrylate, polyethyl acrylate, polystyrene, polyvinyl chloride, synthetic rubber and the like. As fillers can be used, for example, finely-divided silicon dioxide, silicates, bentonites, calcium carbonate and titanium dioxide.

The anaerobic adhesives and sealing compounds according to the invention can be stored for months in partly-filled bottles of glass, polyethylene, etc. without undergoing any change. A relatively low oxygen-partial pressure suffices to inhibit the polymerization. Here as well as in other cases it was found expedient to color the bottles to keep out short-wave light. This has a favorable effect on the stability.

The anaerobically-hardening adhesives are used in the industry for cementing metal sheets or metal parts of different materials or for fastening threads, for sealing pipe joints etc. Due to the combination according to the invention it is not necessary to use an additional accelerator, even with relatively inactive metal surfaces. Naturally it is also possible to accelerate the hardening with known means, for example, by slight heating.

In general so-called "hand-resistant" joints are obtained after a few minutes already with the anaerobic adhesives according to the invention. It should be pointed out that the time to obtain a really good strength which permits practical handling, namely the time required to form a bolt nut joint which possesses a torque breaking strength of at least 50 kpcm, is between about 10 and 30 minutes.

Finally it should be pointed out that per acids react probably at least partially with the tertiary amine contained in the mixture, forming in each instance the corresponding amine oxide. Amine oxides have a certain stabilizing effect, but they do reduce considerably the hardening time when a tertiary amine and a per acid are both added.

In the specification and claims the term "(meth) acrylate" is used to designate esters of acrylic acid and the esters of methacrylic acid. The esters are termed latent adhesives because they do not develop their adhesive properties until they have polymerized.

The invention is further described in the examples which follow. These examples are preferred embodiments of the invention and are not to be construed in limitation thereof.

EXAMPLES 1 to 16

100 g of technical polyethylene glycol dimethacrylate (m.w. approx. 330), which contained 200 p.p.m. of hydroquinone, were mixed with stirring with an accelerator (1.1 g of N,N-dimethyl-p-toluidine) and 5.5 g of 70% commercial cumene hydroperoxide in the indicated order. The last component added was peracetic acid. The following Table 1 contains in the first column the serial number of the example. In the following columns are shown the accelerator and the amount of stabilizer (peracetic acid as 40% by weight solution in glacial acetic acid) which is added.

TABLE 1

| Ex. | Accelerator | Stabilizer (Peracetic Acid) |
|---|---|---|
| 1 | 0.25 g Acetic hydrazide | 1.1 g |
| 2 | 1.1 g Acetic hydrazide | 1.1 g |
| 3 | 0.55 g Acetic hydrazide | 1.1 g |
| 4 | 0.10 g Acetic hydrazide | 1.1 g |
| 5 | 2.2 g Acetic hydrazide | 0.55 g |
| 6 | 2.2 g Acetic hydrazide | 0.25 g |
| 7 | 1.1 g Carbazide of the ethyl ester of carbonic acid | 1.1 g |
| 8 | 1.1 g Carbazide of the ethyl ester of carbonic acid | 0.55 g |
| 9 | 1.1 g Carbazide of the tert.-butyl ester of carbonic acid | 1.1 g |
| 10 | 0.25 g Carbazide of the tert.-butyl ester of carbonic acid | 0.55 g |
| 11 | 1.1 g Benzoic hydrazide | 1.1 g |
| 12 | 1.1 g Benzoic hydrazide | 0.55 g |
| 13 | 1.1 g Benzoic sulfimide | 0.5 g |
| 14 | 1.5 g Benzoic sulfimide | 0.25 g |
| 15* | 1.1 g Carbazide of the ethyl ester of carbonic acid | 0.55 g |
| 16 | — | 0.25 g |

*Without dimethyl toluidine

The compositions of Examples 1 to 16 were tested for:
Hand strength (A)
Time to Achieve a Torque of 50 kpcm. (B)
Strength after 24 hours (C)
Stability at 80° C (D)

A. HAND STRENGTH TEST

In the hand strength test, a few drops of the anaerobically hardening adhesive to be tested are placed on the truns of a degreased bolt (M 10 × 30 DIN 993-8.8) and the appropriate nut is screwed over the bolt. From time to time the nut is turned slightly against the bolt to determine at what time the nut can no longer be turned on the bolt. This time is used as a measure for the hand strength, and is represented in Table 2 in the second column.

B. TIME TO ACHIEVE A TORQUE OF AT LEAST 50 KPCM.

The strength test is carried out on degreased bolts (M 10 × 30 DIN 933-8.8) and nuts. After a few drops of the adhesive have been applied to the bolt and the appropriate nut has been screwed over the bolt, the torque necessary to break the adhesive bond is determined with a torque wrench at intervals of several minutes. As a measure for the strength is considered the time after which a torque of 50 kpcm or more was obtained. Mean values of 5 measurements are listed in col. 3 of Table 2.

C. STRENGTH AFTER 24 HOURS

The torque is kpcm required to break the bond was determined with a torque wrench on cemented bolts and nuts after 24 hours of standing at room temperature. It is listed in col. 4 of Table 2.

D. STABILITY

In the stability test, a test tube of 10 cm length and 10 mm width was 9/10 filled with the mixture according to Examples 1 to 16, and suspended in a bath kept at 80° C. The elapsed time from the hanging of the tubes in the bath to the first formation of gel was measured. All samples were still gel-free after 1 hour. The values regarding the hand strength, the time of the 50 kpcm strength, and the strength after 24 hours were unchanged. The accelerated aging test was stopped, because this test means that the products remain unchanged for over a year at room temperature.

TABLE 2

| Ex. | Hand Strength (minutes) | 50 kpcm Torque (minutes) | Strength After 24 hours (kpcm) |
|---|---|---|---|
| 1 | 5 | 15 | 160 |
| 2 | 5 | 15 | 160 |
| 3 | 5 | 10 | 140 |
| 4 | 7 | 15 | 100 |
| 5 | 5 | 15 | 120 |
| 6 | 5 | 30 | 100 |
| 7 | 2 | 15 | 120 |
| 8 | 2 | 15 | 120 |
| 9 | 5 | 15 | 150 |
| 10 | 3 | 20 | 130 |
| 11 | 7 | 30 | 140 |
| 12 | 7 | 45 | 140 |
| 13 | 8 | 20 | 140 |
| 14 | 5 | 20 | 140 |
| 15 | 10 | 40 | 110 |
| 16 | 10 | 45 | 90 |

We claim:

1. In an aerostable, anaerobically-setting adhesive composition comprising a polymerizable (meth) acrylate ester as principal latent adhesive component, a peroxide polymerization catalyst therefor and an organic polymerization accelerator: a small but effective uniformly distributed amount of a compound selected from the group consisting of the aliphatic and aromatic percarboxylic acids homogeneously dispersible in said composition as agent improving the storage stability of said composition in the presence of molecular oxygen.

2. A composition according to claim 1 wherein the stabilizer is peracetic acid.

3. A composition according to claim 1 wherein the accelerator is a tertiary amine.

4. A composition according to claim 3 wherein the accelerator is N,N-dimethyl-p-toluidine.

5. A composition according to claim 1 wherein the catalyst is cumene hydroperoxide.

6. A composition according to claim 1 wherein the (meth) acrylate ester is the ester of two mols of methacrylic acid with one mol of ethylene glycol.

7. A composition according to claim 1 wherein the agent improving the storage stability of the composition is a percarboxylic acid which is soluble therein.

8. A composition according to claim 1 wherein the percarboxylic acid in an an alkyl percarboxylic acid containing 2 to 8 carbon atoms in the alkyl radical.

9. A method for improving the storage-stability of an aerostable, anaerobically-setting adhesive composition comprising a polymerizable (meth) acrylate ester as principal latent adhesive component, a peroxide polymerization catalyst therefor, and an organic polymerization accelerator, which comprises uniformly incorporating in said composition a small, but effective amount of a compound selected from the group consisting of the aliphatic and aromatic percarboxylic acids homogeneously dispersible in said composition as agent improving the storage stability of said composition in the presence of molecular oxygen.

10. A method according to claim 9 wherein said percarboxylic acid is incorporated in said composition after said catalyst and said accelerator.

* * * * *